United States Patent [19]
Kirk et al.

[11] Patent Number: 5,170,811
[45] Date of Patent: Dec. 15, 1992

[54] ANNEXE

[75] Inventors: Jude C. Kirk, Sunnybank Hills; William F. Bradnam, Rochedale, both of Australia

[73] Assignee: Aussie Traveller Pty. Ltd., Queensland, Australia

[21] Appl. No.: 473,942

[22] PCT Filed: Jun. 10, 1988

[86] PCT No.: PCT/AU88/00187

§ 371 Date: Feb. 9, 1990

§ 102(e) Date: Feb. 9, 1990

[87] PCT Pub. No.: WO88/09856

PCT Pub. Date: Dec. 15, 1988

[30] Foreign Application Priority Data

Jun. 11, 1987 [AU] Australia ................. PI 2406

[51] Int. Cl.⁵ ............................................. E04H 15/08
[52] U.S. Cl. ........................................ 135/89; 160/56; 135/96
[58] Field of Search ............... 135/88, 89, 96, 103, 135/104; 160/66, 46, 50, 55, 56, 58.1, 70, 79

[56] References Cited

U.S. PATENT DOCUMENTS

| | | | |
|---|---|---|---|
| 1,562,355 | 11/1925 | Manassa | 160/58.1 X |
| 1,744,563 | 1/1930 | Martin | 160/58.1 |
| 1,842,598 | 1/1932 | Fogh | 160/58.1 X |
| 2,583,824 | 1/1952 | Dwinell et al. | 160/66 X |
| 4,495,977 | 1/1985 | Delluc | 160/22 X |
| 4,615,371 | 10/1986 | Clauss | 160/70 X |
| 4,719,954 | 1/1988 | Curtis et al. | 135/89 X |
| 4,754,774 | 7/1988 | Leader | 160/66 X |
| 4,848,386 | 7/1989 | Cooper | 135/89 X |
| 4,898,224 | 2/1990 | Woodworth | 160/265 X |
| 4,979,775 | 12/1990 | Klose | 160/370.2 X |
| 4,997,021 | 3/1991 | Brutsaert | 135/89 X |

FOREIGN PATENT DOCUMENTS

| | | | |
|---|---|---|---|
| 2659227 | 7/1977 | Fed. Rep. of Germany | 160/70 |
| 2925911 | 1/1981 | Fed. Rep. of Germany | 160/70 |
| 453100 | 11/1949 | Italy | 160/56 |
| 660900 | 5/1987 | Switzerland | 160/55 |

Primary Examiner—David A. Scherbel
Assistant Examiner—Lan Mai
Attorney, Agent, or Firm—Edwin D. Schindler

[57] ABSTRACT

An annexe assembly is shown which has a support assembly attachable to the side of a caravan or the like and which supports the annexe cover as well as the folded annexe frame. The cover is tapered whereby it may roll upon a spool within the support assembly. The cover may be selectively extended from or retracted into said support assembly and the annexe frame is pivotally attached to the support assembly whereby it may be selectively moved between a stowed attitude substantially within or adjacent the support assembly and an erected attitude for supporting the extended covering.

9 Claims, 5 Drawing Sheets

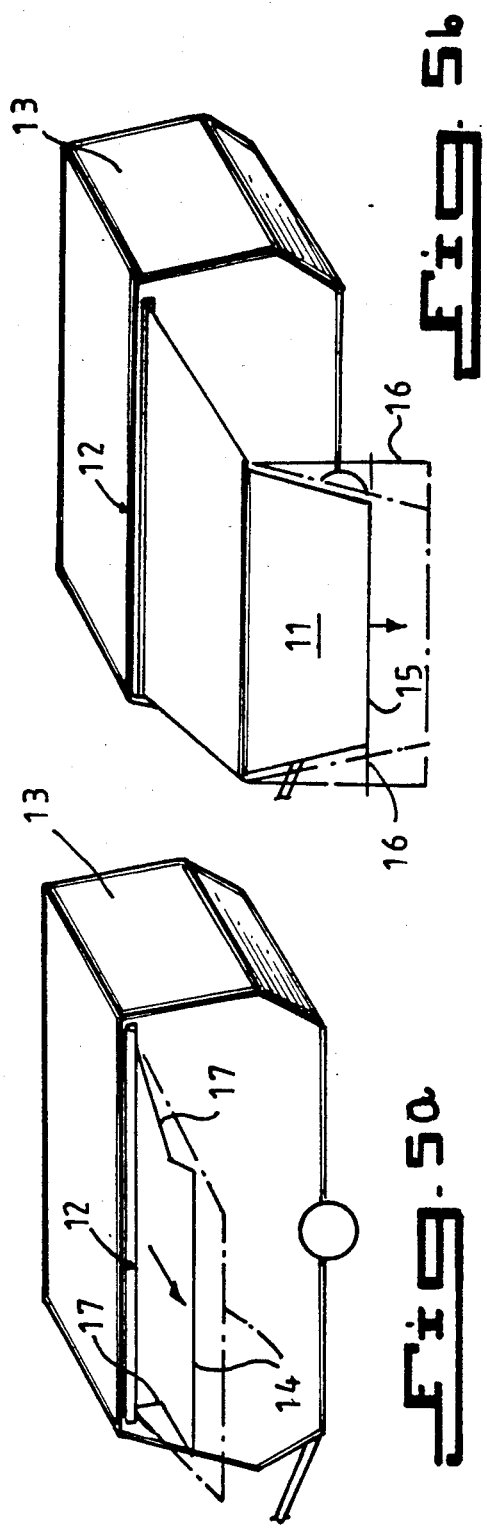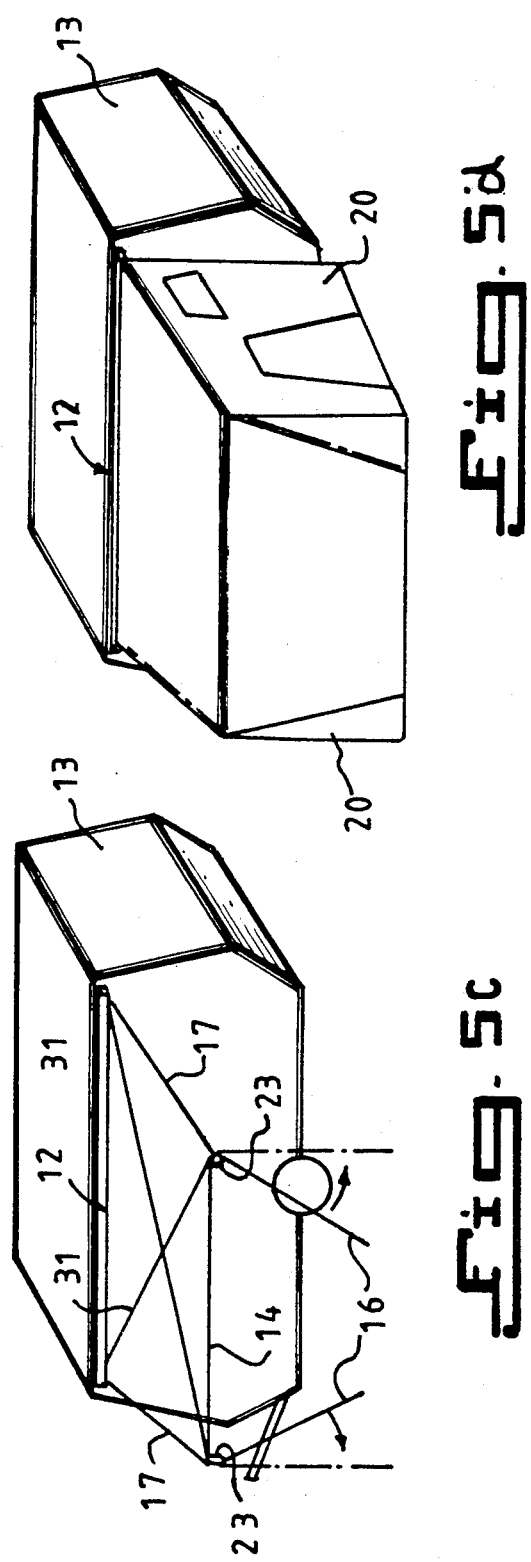

ANNEXE

This invention relates to improved annexes.

An annexe made in accordance with the present invention can be affixed to a caravan or a four wheel drive or other vehicle to provide additional accommodation or it can be mounted on a permanent structure to provide, for example, a temporary car port or additional living space. For illustrative purposes however, this invention will be described hereinafter with reference to its application to caravans.

Most caravans are fitted with an annexe which can be assembled at a journey's destination to provide additional living space beside the caravan. Generally the annexe is formed from fabric stretched about a metal frame or simply stretched between the caravan and supporting posts remote from the caravan. Frequently however, a metal frame is utilized to support the fabric. The frame may include roof stretchers adapted to maintain tension in the roof fabric and rails, particularly along the junction between the roof and the outermost wall of the annexe, and supporting posts. While such annexes are effective in use, they are difficult to stow and the task of erecting, dismantling and stowing the annexe is often time consuming.

The present invention aims to alleviate the above-mentioned disadvantages and to provide an annexe assembly which will be reliable and efficient in operation. Other objects and advantages of this invention will hereinafter become apparent.

With the foregoing and other objects in view, this invention in one aspect resides broadly in an annexe assembly including: a support assembly attachable to a mounting; a retractable flexible covering within said support assembly whereby it may be selectively extended from or retracted into said support assembly, and an annexe frame pivotally attached to said support assembly whereby it may be selectively moved between a stowed attitude substantially within or adjacent said support assembly and an erected attitude for supporting the extended said flexible covering.

The flexible covering may be a fabric covering, which description is to be understood in the specification and claims as covering flexible plastics film or sheeting or the like, and it may be supported on a spool inside a housing in the support assembly whereby it may be rolled from or onto said spool to its operative or stowed positions. The spool may be manually rotatable for retracting the covering or alternatively it may be spring loaded to automatically retract the covering when the latter is released from the supporting frame.

The supporting frame may be universally connected to the housing so that it may be pivoted between a stowed attitude and an operative attitude at which the frame members extend outwardly therefrom and whereby the frame members may be pivotally raised or lowered during the assembly or disassembly process.

Suitably, the annexe frame assembly includes a transverse roof frame member having or being associated with a longitudinal roof frame member which may be pivoted to a position alongside the roof frame member for movement to and from the stowed position. The transverse and longitudinal roof frame members may be maintained in their supporting positions by bracing means connected thereto and spaced from their pivotal connection to one another, or by floor frame members which may be pivotally connected to the lower ends of the wall frame members and be adapted to extend inwardly to engage a lower part of said mounting.

It is also preferred the roof frame members include a corner frame for supporting the fabric along the edges of the roof which is distant from the support assembly. The corner frame may be pivotally attached to the outer end of a roof frame member so that they may be pivoted to a position alongside the roof frame member for movement to and from their stowed position. Alternatively, the corner frame members may be detachably connected to respective adjacent transverse or longitudinal roof frame members and carried, when not in use, in a compartment provided within the housing.

The housing may be provided with quick connection means whereby it may be releasably connected to the side wall of a caravan or the roof of a vehicle for example. In the latter case, roof rack type gutter connections could be provided for supporting the housing above the roof of the vehicle.

The side portions of the covering fabric may be provided with suitable attachment means for attaching end panels thereto to form end walls for the annexe. For this purpose, the covering may have zippers along the side portions and it may be so shaped that the zippers do not roll upon themselves in the housing. For this purpose, the covering may taper inwardly or outwardly from its roller mounting or it may incorporate both inward and outward tapers whereby the bulk of rolled material at the end portions of the roller are maintained within acceptable proportions and is significantly less than that which would occur if the zippers rolled directly upon themselves.

Alternatively, VELCRO type fastening material may he used to provide the end wall connections along with side walls. The fabric covering may include end wall extensions connected to the covering along the opposed roof ends such that the end wall panels may be folded on lop of the fabric covering for retraction about the supporting spool or dropped to an enclosure position when required. The end wall and/or the side walls may be provided with access openings or windows as required.

In another aspect, this invention resides broadly in an annexe assembly including: a support assembly attachable to a mounting; a retractable flexible covering within said support assembly whereby it may be selectively extended from or retracted into said support assembly; an annexe frame for supporting the extended said flexible covering, and the latter being supported as a roll of material when in said retracted attitude and being tapered whereby transverse edge portions thereof do not roll upon themselves in said retracted attitude. Preferably, any window or door openings provided in said covering are also tapered to prevent excessive bundling of the covering in the stowed attitude. Detachable side wall panels may be utilized. These are preferably provided with suitable tapered openings and tapered transverse edges.

In yet another aspect, this invention resides broadly in a frame assembly for an annexe, including:
 a support mounting adapted to be supported at an elevated position;
 a plurality of transverse roof frame members pivotally attached to said support mounting whereby they may pivot between a stowed attitude adjacent said mounting and an extended attitude at which they project outwardly from said mounting;

a longitudinal frame member connected to the outer ends of said transverse roof frame members whereby said longitudinal frame member is supported thereby for movement between a stowed attitude alongside said roof frame members and a supporting attitude at which said longitudinal frame member is disposed in spaced parallel relationship to said support mounting, and a plurality of leg frame members pivotally connected to said longitudinal frame member for movement between raised and lowered positions.

The frame assembly may include a tensioned cable adapted to retract said frame members towards their stowed attitude. preferably there are provided a pair of tensioned cables which cross over one another and extend between opposite ends of said support mounting and said longitudinal frame member and a prop adapted to be supported by said crossed cables to elevate a roof panel above the cables. The cables may be tensioned by rubber tension springs or the like which approach their effective limit of stretch when said corner rail is disposed in its supporting attitude.

In order that this invention may be more readily understood and put into practical effect, reference will now be made to the accompanying drawings which illustrate a typical embodiment of the present invention and wherein:

FIGS. 5a to 5d illustrate the erection sequence of the annexe;

Figure 1:
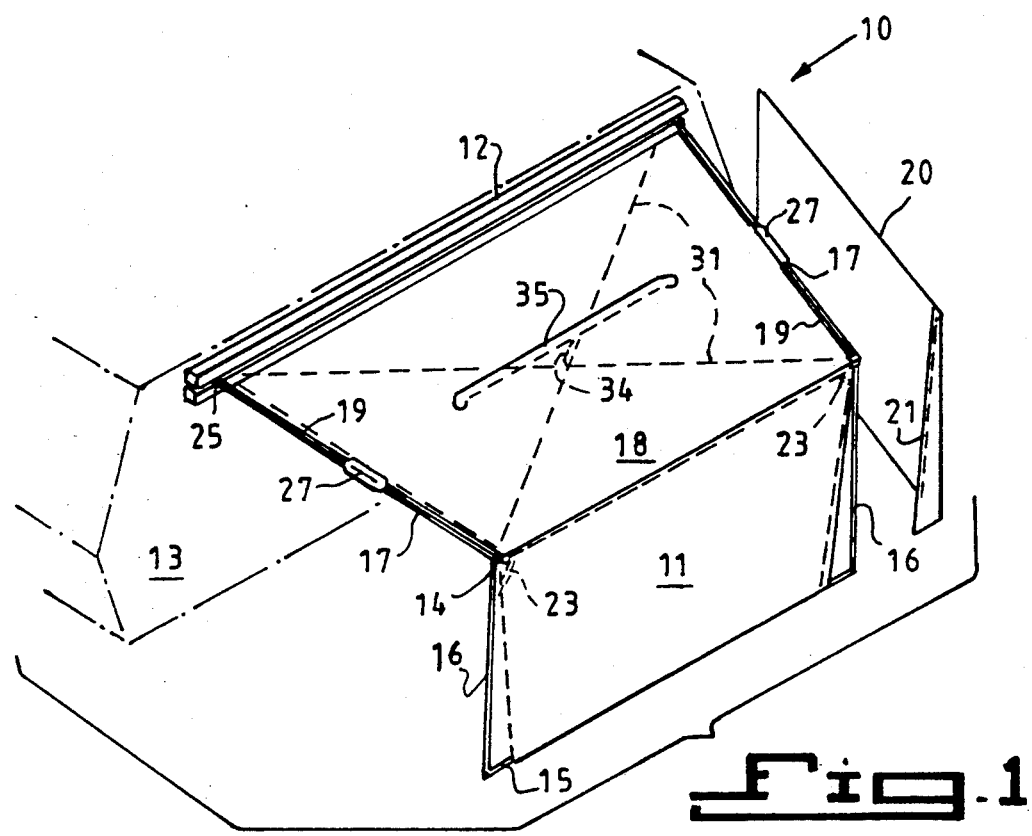
FIG. 1 illustrates one form of annexe attached to the side wall of a caravan.

Referring initially to FIG. 1, it will be seen that the annexe assembly 10 comprises a fabric covering 11 which extends outwardly from a support housing 12, mounted on the side wall of a caravan 13, to a longitudinal roof frame 14 and downwardly across this frame 14 to a ground engaging position. The lower edge of the fabric covering is attached to a rigid bar 15 which may be readily pegged to the ground or secured to the lower ends of the side wall legs 16 which support the longitudinal roof frame 14 in an elevated position. The longitudinal roof frame 14 is connected to the housing by transverse roof frames 17 which combine with the longitudinal roof frame 14 to form a roof support for the roof portion 18 of the fabric covering 11.

The side edges of the fabric covering taper, as illustrated, and are provided with zipper sections 19 to enable end wall panels, one of which is illustrated at 20, to be connected thereto. The inner side edges of the end wall panels are fitted with complementary zipper portions 21 to enable them to be zip connected to the covering 11. As can be seen, the end wall panels extend about the legs and the roof pivot; frames 17 to accommodate the taper in the panel 11.

The transverse roof frames 17 connect for universal pivotal movement to the housing 12 at their inner ends 25 and pivot intermediate their ends at 26 whereby the end portions thereof may be folded to stow alongside one another in the housing 12. A stiffening sleeve 27 is slidably engaged over the frames 17 and is slidable over their respective pivotal connection 26 to hold the frames 17 in a rigid supporting position as illustrated in FIG. 1.

Figure 6:
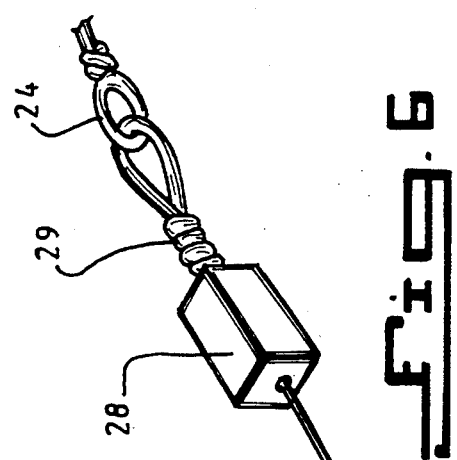
FIG. 6 illustrates the retractable roof bracing stay mounting.

The longitudinal roof frame 14 is provided with an outlet sheave 30 at each end about which stays 31 pass for connection to tension springs 24 supported within the frame 14 which retract the stays 31 from their fully extended position when the frame 14 is moved to its stowed attitude within the housing 12. The stays 31 cross over one another and anchor to the back wall of the housing 12 at opposite ends thereof, adjacent the universal connection 33 of the respective transverse roof frames 17 to the housing 12. A length adjustable strut 34 engages over the crossed stays 31 and extends upwardly to support a ridge pole 35 beneath the roof covering 18. As shown in FIG. 6, each stay 31 passes through a guide block 28 fitted to the longitudinal roof frame 14 and is terminated by a swage 29 which abuts the block 28 when the stay 31 is in its fully extended position. Subsequent extension of the transverse roof frames 17 tensions the stays 31 so that they brace the frame structure.

Figure 2:
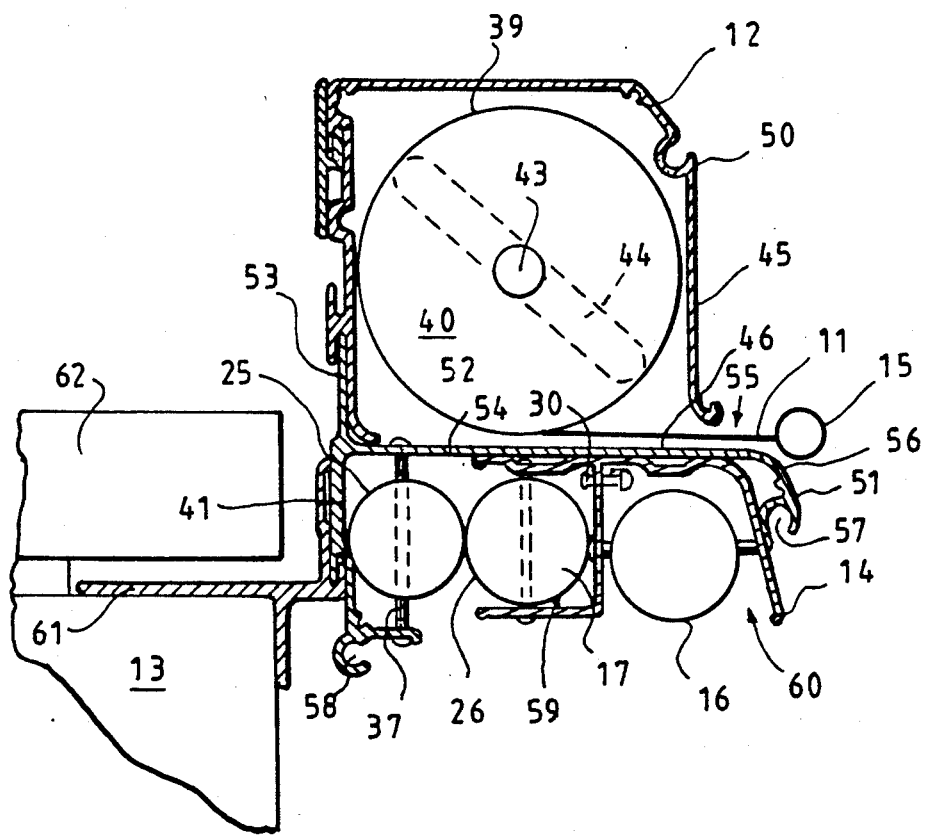
FIG. 2 is an end view illustrating the housing for the roof covering and the annexe frames and its connections thereto.
Figure 3:
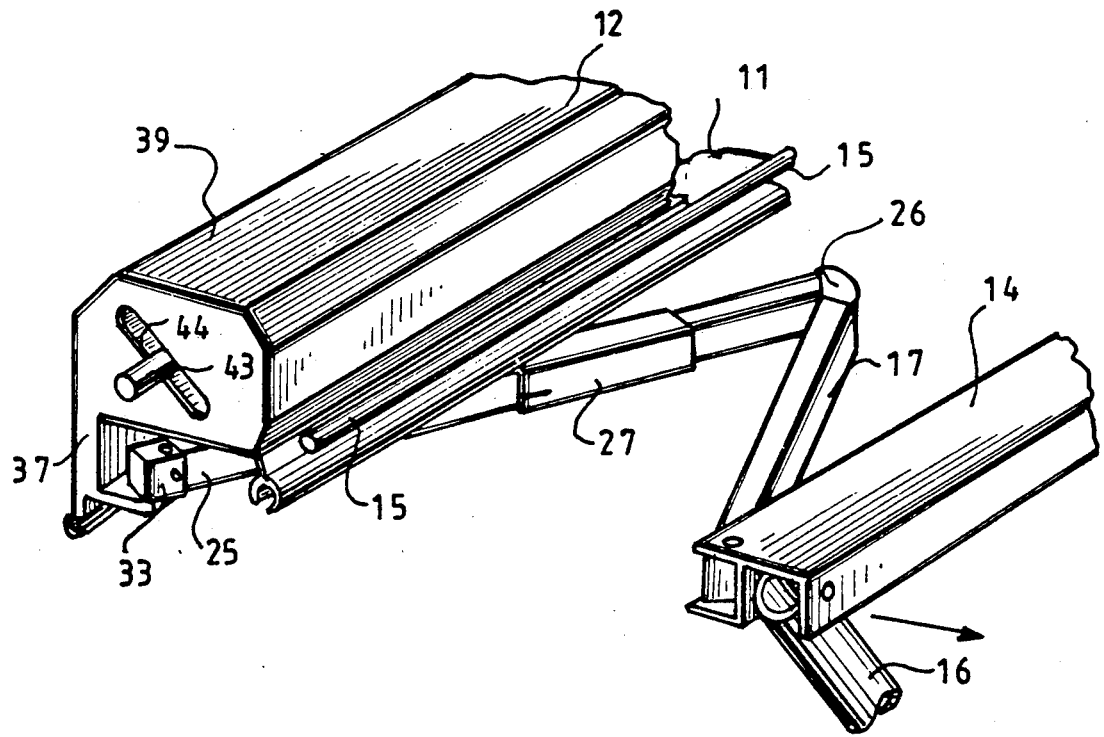
FIG. 3 is a diagrammatic perspective view illustrating the housing and the annexe frames in a partly extended attitude.

Referring to FIGS. 2 and 3, it will be seen that the upper part 39 of the housing 12 accommodates a spool 40 about which the covering 11 is wound while the lower portion 41 of the housing accommodates the folded roof transverse roof frames 17, the longitudinal roof frame 14 and the legs 16. The covering 11 is supported about the spool 40 which is rotatable in the top housing 39. The spool shaft ends 43 engage in diagonal slots 44 whereby during retraction of the fabric from the spool 40, the latter is supported by the front wall 45 and the base wall 46 of the housing 42.

Figure 7:
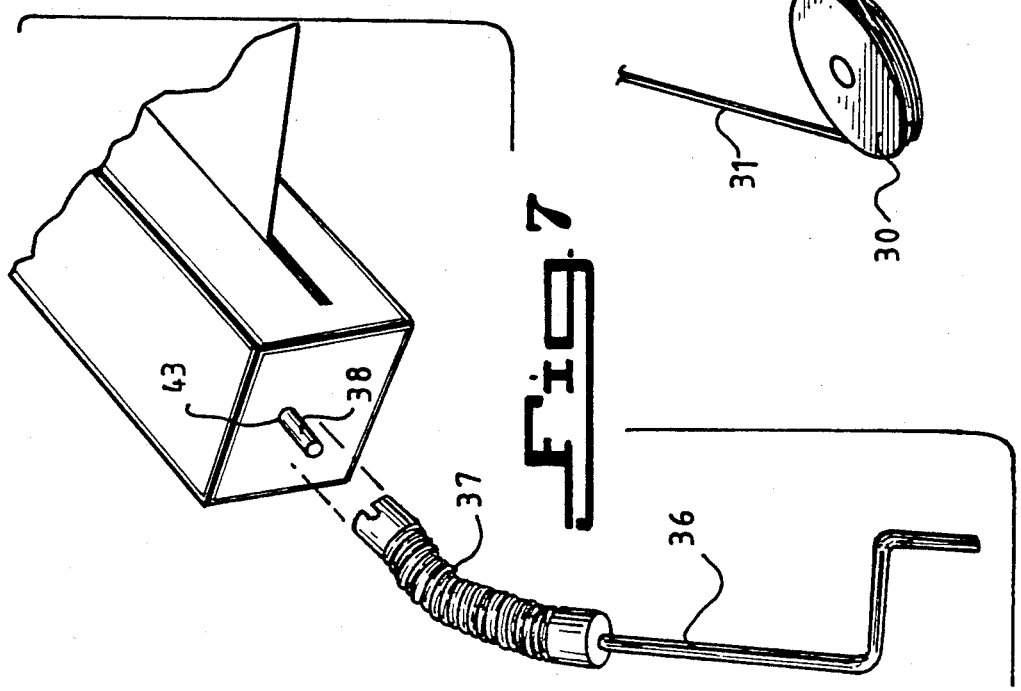
FIG. 7 illustrates the cranking arrangement for retracting the fabric covering.

As illustrated in FIG. 7, one end of the spool 40 may be flexibly coupled to a crank handle 36 through a coil spring drive 37 engageable with the drive pin 38 on the shaft end whereby the shaft 43 may be manually rotated to reel the covering 11 there around in order to tension or retract the covering 11 into the housing 12. Subsequent to tensioning, the shaft may be locked in position by the lock assembly 42.

Figure 8:
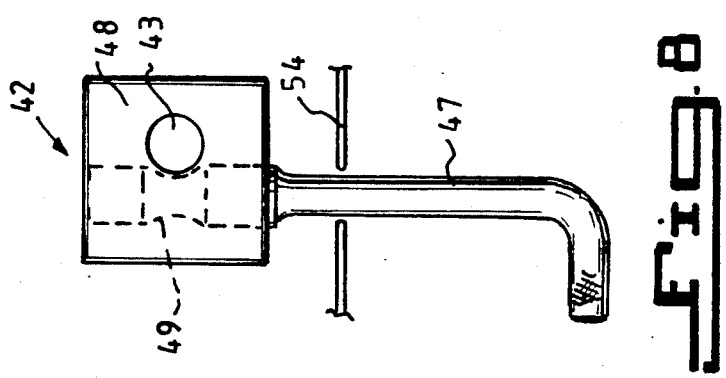
FIG. 8 illustrates the looking assembly for locking the fabric covering in a selected position.

As illustrated in FIG. 8, the lock assembly 42 comprises a rotatable lock handle 47 which passes through the intermediate wall 64 into a threaded block 48 which mounts freely on the shaft 43. The handle is waisted at 48 whereby it may be rotated to a position at which the waisted portion 49 is clear of the shaft 43 or engaged with the shaft 43 to lock the latter against rotation.

In this embodiment, the housing and the side wall frame are formed from respective extrusions. The housing 12 includes a top wall extrusion 60 and a bottom wall extrusion 51 which are joined together by fasteners along their overlapping rear walls 52 and 53. The intermediate wall 54 separating the top and bottom housing sections is constituted by the bottom wall extrusion and the outlet slot 55 through which the fabric covering is retracted from the housing is formed between a lower lip 56 on the top extrusion and the wall 54. The outer edge of the latter is curved downwardly and terminates with a boltrope groove 57. A similar groove 58 is provided along the opposite edge of the bottom extrusion. Ties may be located in the grooves 57 and 58 to retain the frame components in their stowed positions.

The longitudinal roof frame extrusion 14 provides an inwardly facing channel 59 in which the folded outer parts of the roof transverse roof frames 17 may be located, and a downwardly facing channel 60 into which the legs 16 may be retracted. The legs 16 and the transverse roof frames 17 are pin connected to respective opposing walls of the frame 14 as illustrated. The housing is supported by a further angle like extrusion 61 whereby the housing is supported clear of the hatch 62 of the caravan 13.

Figure 4:
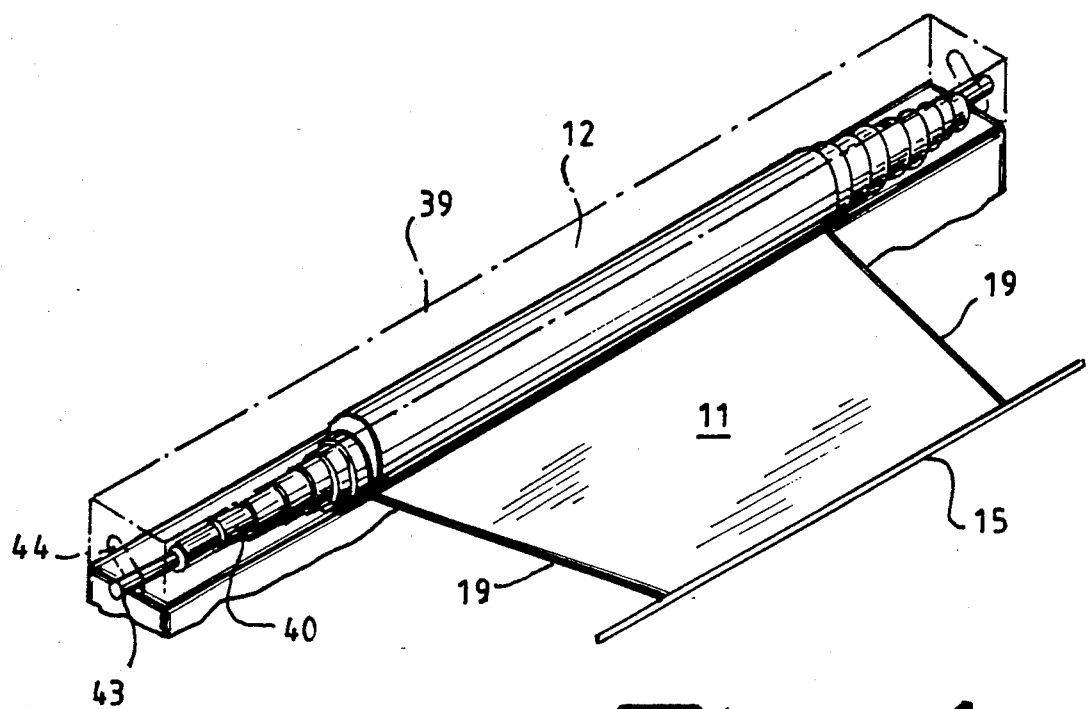
FIG. 4 is a diagrammatic perspective view illustrating the arrangement of the roller mounted covering.

FIG. 4 illustrates the mounting of the retractable fabric covering 11. It will be seen that the zipper portions 19 and 21 do not roll upon themselves on the spool 40, due to the taper of the covering 11. Accordingly the bulk of the rolled-up cover is much the same as for a plain fabric wound about the spool. Furthermore, as localised bulging of the retracted cover is prevented, the latter will remain easy to roll onto the spool 40.

FIGS. 5a to 5d illustrate the erection sequence of the annexe assembly 10 described above. In use, the annexe assembly 10 may be connected to a caravan 13 as illustrated and maintained in the stowed attitude while travelling or in a confined space. When the annexe is required, the frame members 14, 16 and 17 are unlocked and pivoted to extend outwardly from the housing 12 as illustrated in FIG. 6a. When they are pivoted to their extended positions the outer ends of the roof transverse roof frames 17 may be lowered to rest on the ground. The sleeves 27 may then be slid to a locking position about the pivotal connections 26 and the longitudinal roof frame 14 may be elevated to enable the legs 16 to fold down and be locked in place by the linkages 23 as illustrated in FIG. 5b. In this configuration the bracing stays 31 will be stretched tightly between the housing 12 and the longitudinal roof frame 14.

When the frame has been erected the tapered fabric covering 11 may be withdrawn from the housing 12 across the roof frames 14 and 17 and down to the lower edge of the legs 16. The bar 15 is then attached to the lower ends of the legs or pegged down to complete the basic annexe structure as illustrated in FIG. 5c. This is then further rigidified by engaging the strut 34 over the crossover of the stays 31 and supporting the ridge pole 35 by the strut 34 and beneath the fabric. This also has the effect of elevating the central portion of the roof 18 to prevent water accumulation thereon. End walls 20 may then be zipper fastened to the fabric covering as desired to provide an enclosed and lockable annexe as illustrated in FIG. 5d.

It will be understood from the above that the basic annexe structure which provides shade and shelter, can be very quickly erected or folded to its stowed attitude without the need to locate individual pieces and assemble same in a particular manner. Such an annexe will be particularly useful for connection to a four wheel drive vehicle or the like as it will be light and may be readily erected and stowed.

Figure 9:
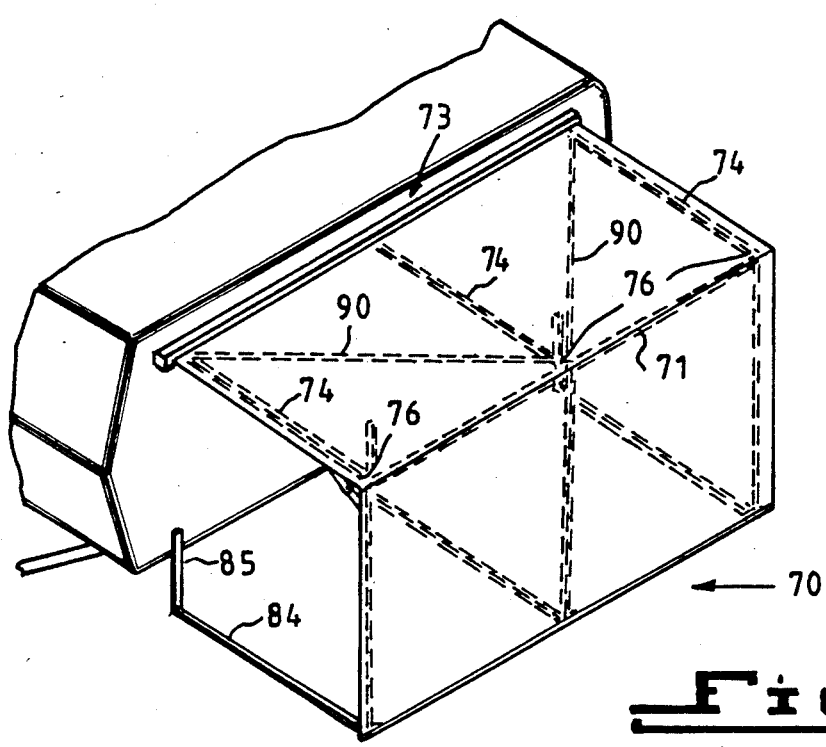
FIG. 9 illustrates an alternate embodiment of the invention.
Figure 10:
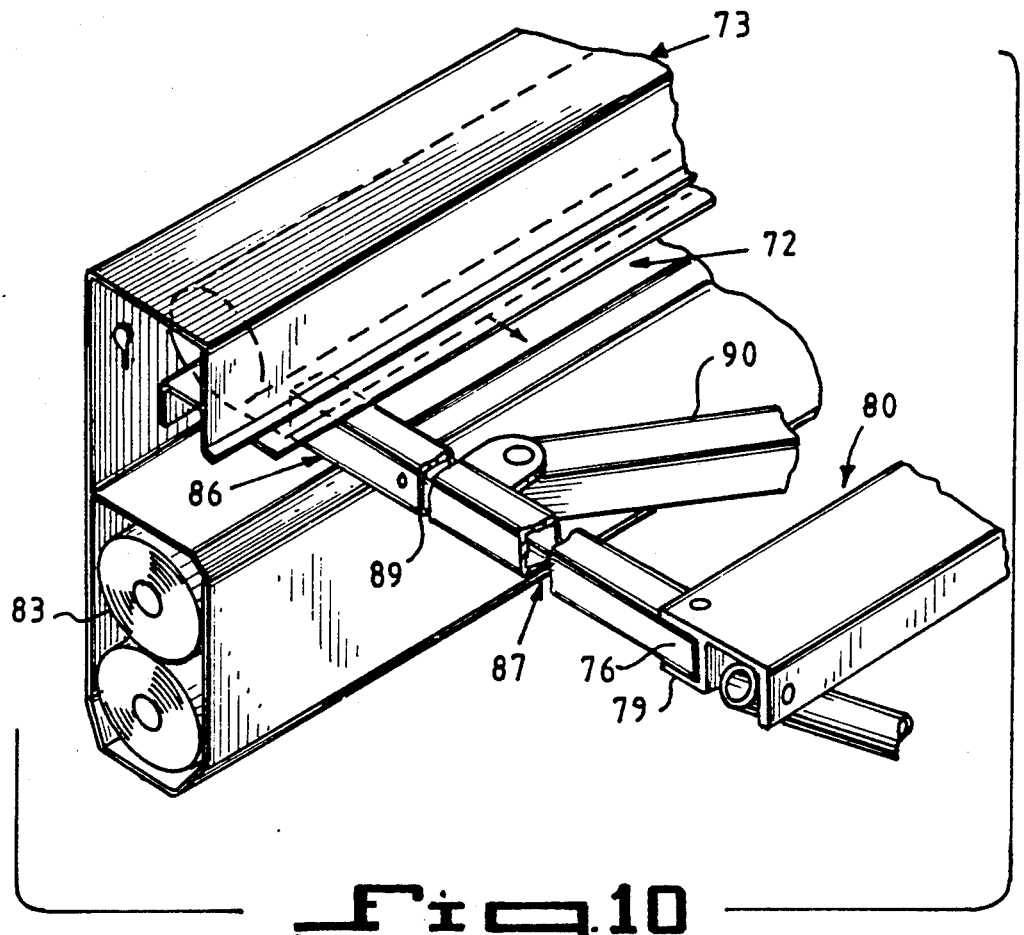
FIG. 10 is an enlarged end view of the housing and frame illustrated in FIG. 9.

The annexe assembly 70 illustrated in FIGS. 9 and 10 has a folding frame 71 which folds into a recess 72 in the housing assembly 73. The folding frame 71 includes a three centrally folding rafters 74 pivotally connected to the outer ends of the recess 72 into which they may retract into respective end portions thereof. Their outer ends 76 connect pivotally to an inwardly facing channel 79 in the wall frame member 80. The frame member 80 is also provided with a downwardly facing channel 81 into which the legs 78 may he retracted for storage purposes. The frame member 80 closes the recess 72 when in the stowed position. The housing assembly 73 also includes a separate lower housing 83 in which the rolled fabric end panels are stored when not in use. The folding rafters 74 are formed with overcentre pivoting joints arranged to look in their extended attitude. These joints 83 may be pushed inwards to cause the rafters to fold for retraction in the housing 73.

The lower ends of the legs 78 are attached to respective floor frames 84 which return across the floor to connect to brackets 86 mounted on the side wall of the caravan below the housing 73. It will be seen that each roof rafter 74 includes a mounting portion 86 which is pivotally supported in the housing 73 and an outer section 87 which extends outwardly to connect pivotally to the wall frame member 80. The outer section 87 is hingedly connected to the inner section 86 by the flexible joint 89 such that the outer section may be raised and lowered without placing a bending stress on the pivot connection between the inner section 86 and the support housing 73 about which the frame members move between stowed and operative attitudes. Intermediate diagonal braces 90 extend between the inner end of outer section 87 and the frame member 80.

It will of course be realised that the above has been given only by way of illustrative example of the present invention and that all such modifications and variations thereto as would be apparent to persons skilled in the art are deemed to fall within the broad scope and ambit of this invention as is defined in the appended claims.

The claims defined in this invention are as follows:

1. An annexe assembly, comprising:
 a support assembly attachable to a mounting;
 a retractable flexible covering supported as a roll within said support assembly, said retractable flexible covering being able to be selectively moved between an extended attitude and a retracted attitude relative to said support assembly; and,
 an annexe frame for supporting said retractable flexible covering when said retractable flexible covering is in said extended attitude, said retractable flexible covering being tapered whereby transverse edge portions thereof do not roll upon themselves in said retracted attitude.

2. The annexe assembly according to claim 1, said annexe frame being pivotally attached to said support assembly and being selectively movable between a stowed attitude substantially within or adjacent said support assembly and an erected attitude for supporting said retractable flexible covering in said extended attitude.

3. The annexe assembly according to claim 2, wherein said annexe frame includes opposed transverse roof frame assemblies pivotally connected so said support assembly and a wall frame assembly pivotally attached to said transverse roof frame assemblies, said roof frame assemblies being capable of being stowed juxtapositioned in said support assembly.

4. The annexe assembly according to claim 3, wherein said wall frame assembly includes a longitudinal roof frame member pivotally connected to outer end portions of said transverse roof frame assemblies, said traverse roof frame assemblies including inner and outer transverse roof frame members pivotally connected together and adapted to lie alongside one another in said stowed attitude, said transverse roof frame assemblies being pivotable from a stowed mode juxtapositioned said wall frame assembly to a supporting mode.

5. The annexe assembly according to claim 4, wherein said wall frame assembly includes wall frame members pivotally connected to outer end portions of said longitudinal roof frame member and adapted to support said longitudinal roof frame member in an elevated position.

6. The annexe assembly according to claim 1, wherein retractable flexible covering is supported on a spool mounted within a housing in said support assembly, said support assembly further including an auxiliary housing for stowing said wall panels.

7. The annexe assembly according to claim 1, wherein said annexe frame further includes tensioned cable means adapted to bias said annexe frame towards a stowed attitude.

8. The annexe assembly according to claim 7, wherein said tensioned cable means includes a pair of tensioned cables which crossover one another and extend between opposite ends of said mounting of said support assembly and said longitudinal roof frame member, said annexe assembly further including a ridge pole assembly supportable by said tensioned cables for elevating said flexible covering above said tensioned cables.

9. An annexe assembly, comprising:
a support assembly attachable to a mounting;
a retractable flexible covering within said support assembly, said retractable flexible covering being selectively extendable from or retracted into said support assembly; and,
an annexe frame for supporting said retractable flexible covering in an extended attitude, said retractable flexible covering being supported as a roll when in a retracted attitude and being tapered whereby transverse edge portions thereof do not roll upon themselves in said retracted attitude.

* * * * *